United States Patent [19]

Hamaguchi et al.

[11] Patent Number: 4,849,275

[45] Date of Patent: Jul. 18, 1989

[54] CORDIERITE HONEYCOMB STRUCTURAL BODIES

[75] Inventors: Kunikazu Hamaguchi, Nagoya; Toshiyuki Hamanaka, Suzuka; Takashi Harada, Nagoya; Seiichi Asami, Okazaki, all of Japan

[73] Assignee: NGK Insulators, Ltd., Japan

[21] Appl. No.: 151,996

[22] Filed: Feb. 3, 1988

[30] Foreign Application Priority Data

Feb. 12, 1987 [JP] Japan .................. 62-28365

[51] Int. Cl.$^4$ .............................. B32B 3/12
[52] U.S. Cl. .................... 428/116; 156/89; 428/332; 502/527
[58] Field of Search .............. 55/523; 156/89; 502/527; 428/116, 188, 332

[56] References Cited

U.S. PATENT DOCUMENTS

| | | | |
|---|---|---|---|
| 3,885,977 | 5/1975 | Lachman et al. | 501/80 |
| 3,950,175 | 4/1976 | Lachman et al. | 501/80 |
| 3,958,058 | 5/1976 | Elmer | 428/332 X |
| 4,177,307 | 12/1979 | Torii et al. | 428/188 X |
| 4,268,311 | 5/1981 | VerDow | 501/153 X |
| 4,280,845 | 7/1981 | Matsuhisa et al. | 501/43 |
| 4,295,892 | 10/1981 | Matsuhisa et al. | 428/116 X |
| 4,435,512 | 3/1984 | Ito et al. | 501/118 X |
| 4,495,300 | 1/1985 | Sano | 501/105 X |
| 4,540,671 | 9/1985 | Kono et al. | 501/9 |
| 4,559,193 | 12/1985 | Ogawa et al. | 428/117 X |
| 4,772,580 | 9/1988 | Hamanaka et al. | 502/527 X |

FOREIGN PATENT DOCUMENTS

| | | |
|---|---|---|
| 0202107 | 5/1986 | European Pat. Off. . |
| 2249850 | 11/1974 | France . |
| 1518475 | 3/1977 | United Kingdom . |
| 2091239 | 11/1981 | United Kingdom . |

Primary Examiner—Henry F. Epstein
Attorney, Agent, or Firm—Arnold, White & Durkee

[57] ABSTRACT

Cordierite honeycomb structural bodies having excellent coatability for a material of high specific surface area and a catalyst thereon and low thermal expansion are disclosed. The cordierite honeycomb structural body as a chemical composition essentially consisting of from 42 to 56% of $SiO_2$, from 30 to 45% of $Al_2O_3$, and from 12 to 16% of MgO in terms of weight and contains cordierite as a main component of a crystalline phase. Porosity of the cordierite honeycomb structural body is from over 30% to not more than 42%. The total volume of pores having a diameter of from 0.5 to 5 μm and the total volume of pores having a diameter of not less than 10 μm are not less than 70% and not more than 10% of the total pore volume of the honeycomb structural body, respectively.

4 Claims, 3 Drawing Sheets

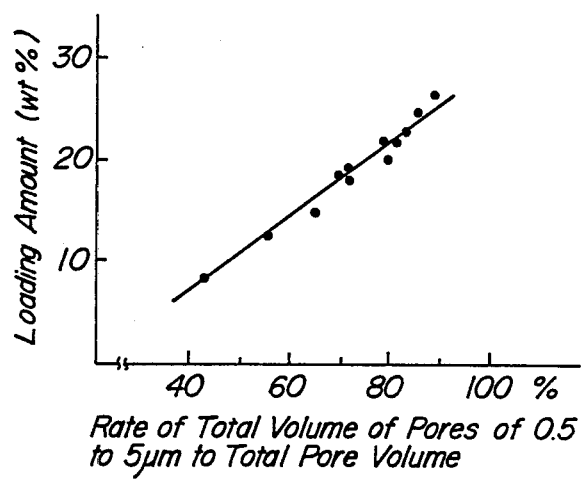
FIG_1
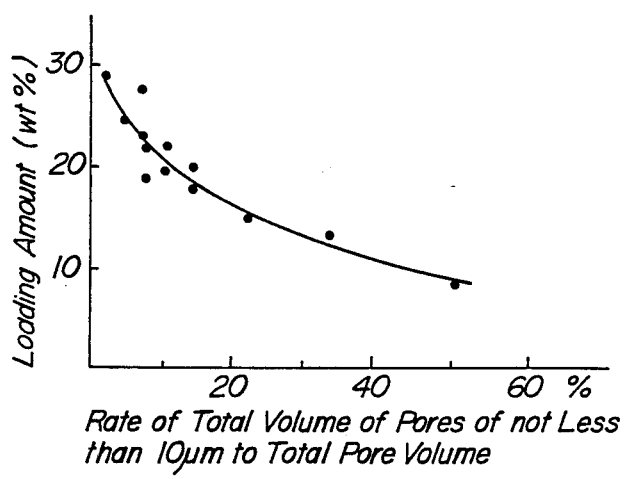
FIG_2

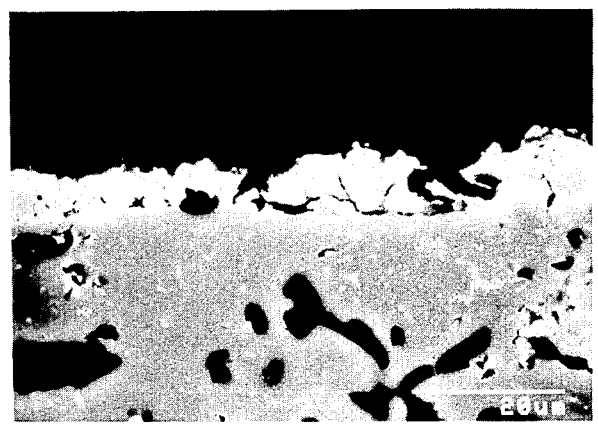
FIG_4a
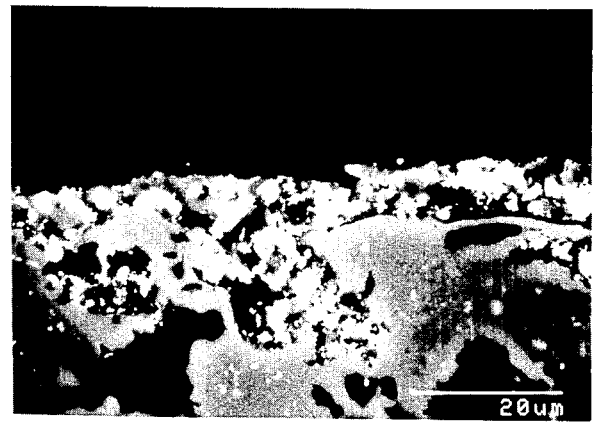
FIG_4b
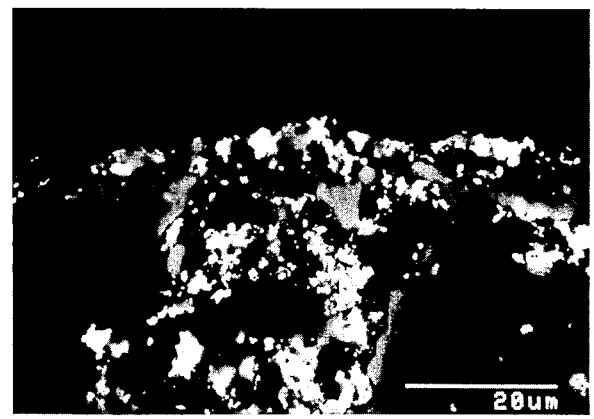
FIG_4c

4,849,275

CORDIERITE HONEYCOMB STRUCTURAL BODIES

BACKGROUND OF THE INVENTION (1.) Field of the Invention

The present invention relates to cordierite honeycomb structural catalyst carriers. More particularly, the invention relates to low thermal expansion honeycomb structural bodies which have excellent coatability, that is, capability of coating a material of a high specific surface area and a catalyst thereon, and which are used as carriers for catalysts to purify waste gases from automobiles.

(2.) Related Art Statement

In general, honeycomb structural catalysts used for the purification of waste gases from automobiles are produced by coating a material of a high specific surface area, such as activated alumina and a catalytic metal such as platinum on surfaces of low thermal expansion cordierite honeycomb structural catalyst carriers of a monolithic structure.

The coatability for a material of a high specific surface area and a catalyst is an important characteristic required for cordierite honeycomb structural catalyst carriers. In order to attain such an important characteristic, porosity has been required for the cordierite honeycomb structural bodies from the standpoint of mass productivity of cordierite honeycomb structural catalysts.

On the other hand, thermal shock resistance is also another important characteristic required for the above-mentioned honeycomb structural catalysts. Thus, the honeycomb structural catalysts are required to have thermal shock resistance high enough to withstand heat stress which is caused by temperature differentials occurring inside the honeycomb structural catalysts when being subjected to temperature changes in rapid heat generation due to catalytic reaction of unburnt hydrocarbons and carbon monoxide contained in a waste gas, and in rapid heating or rapid cooling during engine starting or stopping, respectively.

It is found that the thermal shock resistance is represented by a tolerable difference in temperature during rapid heating and rapid cooling and that the tolerable temperature difference is inversely proportional to a coefficient of thermal expansion among the characteristics of honeycomb structural bodies. Thus, the smaller the coefficient of thermal expansion, the larger the tolerable temperature difference. This is the biggest reason why low thermal expansion cordierite is used as ceramic honeycomb structural catalyst carriers for honeycomb structural catalysts.

It is conventionally known that cordierite ceramics exhibit low thermal expansion. For instance, as disclosed in U.S. Pat. No. 3,885,977 (Japanese patent application Laid-open No. 50-75,611), oriented cordierite ceramics are known, in which a coefficient of thermal expansion is smaller than $1.1 \times 10^{-7} (1/°C.)$ in a temperature range from 25° C. to 1,000° C. in at least one direction. The 1977 patent describes that the orientation is caused by planar orientation due to plating clay or delaminated clay of kaolin or the like.

Further, Japanese patent application Laid-open No. 53-82,822 discloses that cordierite exhibits extremely low thermal expansion when a magnesia-source material such as talc is used in a limited coarse grain range of from 10 to 50 $\mu$m.

However, since a high specific surface area-possessing material having a far greater coefficient of thermal expansion as compared with cordierite, such as activated alumina, is carried onto the surface of a low thermal expansion cordierite material in the case of honeycomb structural catalysts, thermal shock resistance of the honeycomb structural catalyst cannot be improved merely by lowering the coefficient of thermal expansion of the cordierite honeycomb structural carriers. That is, there has been demanded a technique by which an increase in the thermal expansion of the cordierite honeycomb structural bodies, when such a material having a high specific surface area is carried thereon, is suppressed to as low as possible.

In order to increase porosity of cordierite honeycomb structural carriers, enhance coatability for a material of a high specific surface and a catalyst, and improve thermal shock resistance of the carriers, even when coated, the following techniques have been proposed.

(1) U.S. Pat. No. 3,950,175 (Japanese patent application Laid-open No. 50-75,612) discloses that cordierite based porous ceramic materials in which at least 20% of open pores are given a diameter of more than 10 $\mu$m through replacing a part or the whole part of talc or clay in starting materials by pyrophyllite, kyanite, quartz, silica such as fused silica, or a silica-alumina source material.

(2) Japanese patent publication No. 51-44,913 discloses that a ceramic powder is deposited onto surfaces of thin walls of a honeycomb structural body made of a ceramic material, which is fired. Thereby, a surface layer in which the total volume of pores having a pore diameter of not less than 5 $\mu$m is not less than 0.1 cm$^3$/g is formed to improve coatability for activated alumina and a catalyst.

(3) Japanese patent application Laid-open No. 58-14,950 discloses that when activated alumina as a high specific surface area-possessing material is to be coated onto a cordierite honeycomb structural body, an organic material such as methyl cellulose is precoated so that the activated alumina may enter microcracks in the cordierite honeycomb structural body to improve thermal shock resistance of a resulting honeycomb structural catalyst.

However, the above techniques (1) to (3) have the following drawbacks.

In the technique (1), it was found that a high specific surface area-possessing material such as activated alumina having a high coefficient of thermal expansion is likely to enter pores having a pore diameter of not less than 10 $\mu$m and that the greater the volumetric rate of the pores of not less than 10 $\mu$m, the more the thermal shock resistance of the honeycomb structural catalyst deteriorates. That is, pores of not less than 10 $\mu$m damage thermal shock resistance of the honeycomb structural body after it is coated.

The technique (2) unfavorably require a step of depositing the ceramic powder onto the surfaces of the honeycomb structural body. Thus, cost increases to a large extent. Further, fine pores of from 0.5 to 5 $\mu$m are difficult to form unlike in the present invention.

In the technique (3), adhesion between the high specific surface area-possessing material such as activated alumina and the cordierite honeycomb structural carrier becomes detrimental so that the coated layer is likely to peel. Further, the number of steps for coating increases to greatly raise the cost.

Under the circumstances, cordierite honeycomb structural catalyst carriers which simultaneously meet excellent coatability for a material of a high specific surface area and a catalyst thereon and improved thermal shock resistance of cordierite honeycomb structural catalysts with coated layers have earnestly been demanded.

SUMMARY OF THE INVENTION

It is an object of the present invention to eliminate the above-mentioned drawbacks, and to provide cordierite honeycomb structural bodies which are suitably used as honeycomb structural catalyst carriers having smaller degradation of thermal shock resistance by coating a high specific surface area-possessing material of a higher coefficient of thermal expansion than that of the cordierite carrier and a catalystic component the carrier.

The cordierite honeycomb structural bodies according to the present invention have a chemical composition essentially consisting of from 42 to 56% of $SiO_2$, from 30 to 45% of $Al_2O_3$, and from 12 to 16% of MgO, in terms of weight, and contain cordierite as a main component in a crystalline phase, wherein the porosity of the honeycomb structural bodies is from over 30% to not more than 42%, the total volume of pores having from 0.5 to 5 $\mu$m in diameter is not less than 70% of the total pore volume which is the total volume of the entire pores, and the total volume of pores having not less than 10 $\mu$m in diameter is not more than 10%.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a graph showing the relationship between a loading amount of a coating material and the rate of the total volume of pores having 0.5 to 5 $\mu$m in diameter relative to the total pore volume;

FIG. 2 is a graph showing the relationship between the loading amount of a coating material and the rate of the total pore volume of pores having 10 $\mu$m or more in diameter relative to the total volume;

FIGS. 4(a), (b), and (c) are SEM (Scanning Electron Microscope) photographs showing the microstructure of interfaces between carriers and coated activated alumina according to the present invention and Comparative Examples.

DETAILED DESCRIPTION OF THE INVENTION

Figure 3:
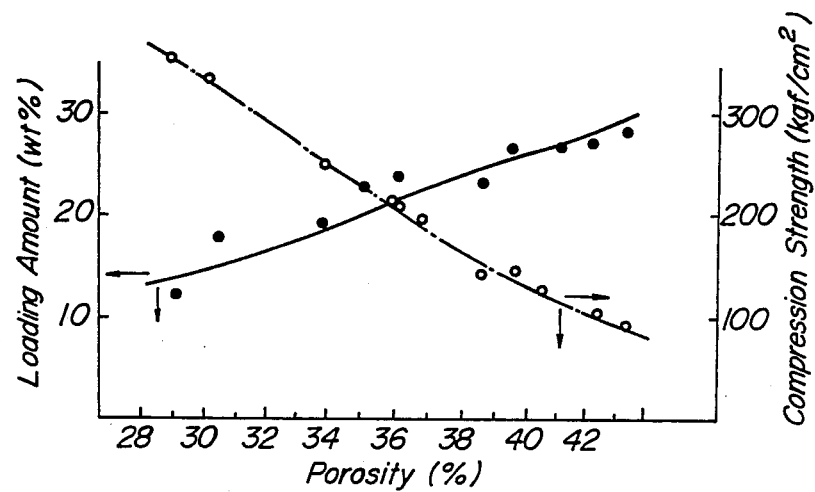
FIG. 3 is a graph showing the relation among porosity, the loading amount of a coating material, and compression strength.

Taking a theoretical composition ($2MgO.2Al_2O_3.5SiO_2$) of cordierite, conventionally known as the composition of low thermal expansion cordierite ceramic materials, as a reference, the chemical composition of the honeycomb structural bodies according to the present invention is from 42 to 56%, preferably from 47 to 53% of $SiO_2$, from 30 to 45%, preferably from 32 to 38% of $Al_2O_3$, and from 12 to 16%, preferably from 12.5 to 15% of MgO in terms of weight. By varying various producing conditions, that is, changing material sources, the grain size of starting materials, and firing conditions, it becomes possible to attain a porosity of from 30 to 42%, a rate of the total volume of pores having from 0.5 to 5 $\mu$m in diameter relative to the total pore volume being not less than 70%, and a rate of the total volume of pores having not less than 10 $\mu$m in diameter relative to the total pore volume being not more than 10%.

In many cases, chemical components other than the main components adversely affect thermal expansion. Thus, it is preferable to restrain the total content of impurities such as $TiO_2$, CaO, $K_2O$, $Na_2O$, $Fe_2O_3$, and $P_2O_5$ to 2.5% or less. In particular, the smaller an amount of an alkaline component such as CaO, $K_2O$, and $Na_2O$, the more excellent influences upon the thermal expansion.

It is preferable that the crystalline phase substantially consists of cordierite crystals. The crystalline phase preferably contains not less than 90% by weight of the cordierite crystals, and also contains mullite and spinel (including sapphirine) as other crystals.

With respect to the coatability for a material of a high specific surface area such as activated alumina and a catalyst thereon, it has formerly been pointed out that it is related to water-absorbing percentage and porosity. The present inventors have newly made it clear that a certain pore diameter zone, that is, from 0.5 to 5 $\mu$m is more greatly attributable to the coatability as its factors than the porosity. Further, it was found that pores of at least 10 $\mu$m in diameter which have been introduced into cordierite carriers to maintain porosity adversely deteriorate the coatability and increase variation in the loading amount of the coating material.

The reason why the pores of from 0.5 to 5 $\mu$m contributes to the coatability is considered to be that the activated alumina and catalyst depositing speed takes a maximum value in the pores of this diameter range due to the grain size of the material having high specific surface area such as activated alumina and a water-absorbing phenomenon owing to a capillary action. In addition, the pores of 10 $\mu$m or more are considered to cause the material of high specific surface area to impregnate surface pores and produce variation in the loading amount of a coating material.

It is recognized that there exists a certain relation between the coatability and the porosity. When the porosity is 30% or less, the coatability is poor. On the other hand, the coatability is improved through maintaining the volumetric ratio of pores of 0.5 to 5 $\mu$m in diameter and increasing porosity, but mechanical strength as another important characteristic required for honeycomb structural catalysts is deteriorated.

With respect to industrially most popularly employed honeycomb structural bodies in which a wall thickness is 150 $\mu$m and the number of cells per 1 $cm^2$ is 62, it is necessary that the compression strength in a flow path direction is practically not less than 100 $kgf/cm^2$, and preferably not less than 200 $kgf/cm^2$, which correspond to 42% and 36% in porosity, respectively.

It was newly found out that the pores of not less than 10 $\mu$m play an important role with respect to thermal shock resistance after the coating of a material of a high specific surface area. The particle size of high specific surface area-processing activated alumina ordinarily used to maintain catalytic activity is from 5 to 10 μm. Owing to this, though the activated aluminadepositing speed is low, activated alumina is likely to enter pores of 10 μm or more. In particular, since activated alumina enters inside honeycomb structure partition walls, coefficient of thermal expansion of the carrier greatly increases. Thus, it was found out that pores of not less than 10 μm which have been introduced to improve the coatability are an unfavorable factor with respect to both the coatability and the thermal shock resistance after the coating.

In the construction of the present invention, excellent coatability can be obtained when the rate of the total volume of pores of from 0.5 to 5 μm in diameter relative to the total pore volume is not less than 70%, preferably not less than 80%. Further, when the total volume of pores having not less than 10 μm relative to the total pore volume is controlled to not more than 10%, it is possible that the coatability is improved, variation in the loading amount of a coating material is restrained, and increase in coefficient of thermal expansion after the coating is minimized. In order to certainly acquire these effects, it is necessary that the coefficient of thermal expansion in a temperature range from 40° to 800° C. of the carrier is not more than $1.0 \times 10^{-6}/°$ C. When the pore distribution meeting both the above-mentioned requirements is realized, the coatability and the thermal shock resistance after a material of a high specific surface area and a catalyst are coated can be improved to a great extent.

In the production of the cordierite honeycomb structural bodies having the above pore distribution according to the present invention, producing conditions can readily be selected from a variety of conventional producing processes. For instance, starting materials having specific particle sizes are mixed together, to which a plasticizer and a binder are added for plasticization to obtain a batch mixture. The thus plasticized batch mixture is shaped by extrusion and dried, which is then fired at a given temperature to obtain the cordierite honeycomb structural body. In this case, attention should preferably be paid to the following points.

It is effective to cut a particular portion having a certain coarse grain size zone in a particle distribution curve of raw materials, particularly, talc and use fine alumina as a raw material. To optimize the porosity, it is also effective to use fine graphite powder, fine wheat powder, or fine starch powder.

In the firing step, it is effective to control a temperature-rising rate in a range from 1,000° to 1,400° C., that is, to select a temperature-rising rate controlled to not more than 50° C./hr. Moreover, the rate of the total volume of pores of 0.5 to 5 μm can be increased by varying the maximum temperature and the firing time.

When the rate of the total volume of pores of 0.5 to 5 μm is increased by varying the firing conditions, the coefficient of thermal expansion of the cordierite honeycomb structural carrier must be controlled to not more than $1.0 \times 10^{-6}/°$C. to cope with incidental increase in the coefficient of thermal expansion of the carrier.

The present invention is not limited to a case where the honeycomb structural bodies are coated with activated alumina as a material of a high specific surface area (wash coat), but the invention also effective to an activated alumina wash coat containing a rare earth element oxide such as $CeO_2$ and/or a noble metal catalytic component such as Pt, a wash coat of $ZrO_2$ or other material having a high specific surface area.

In the following, examples of the present invention will be explained. These examples are merely given in illustration of the invention and should never be interpreted to limit the scope of the invention.

EXAMPLE 1

A mixture was prepared by using talc, kaolin, calcined kaolin, alumina, and graphite having chemical compositions in Table 1 at mixing proportions shown in Table 2, and then shaped by a known extruding method, followed by firing, thereby obtaining Run Nos. 1-13 in Table 3. Each of the thus obtained cordierite honeycomb structural catalyst carriers had a pore distribution shown in Table 3, a wall thickness of 150 μm, a diameter of 101 mm, and a length of 152 mm with the number of cells being 62/cm². In the production of the catalyst carriers, the particle size of the starting materials, and a temperature-elevating rate in a firing temperature range of from 1,000° to 1,400° C., the maximum temperature, and a firing time period as firing conditions were varied.

As a material having a high specific surface area, a coating slurry containing 30% of a solid component was prepared by using 95% by weight of boehmite phase activated alumina having the average grain diameter of 9 μm and 5% by weight of alumina sol together with diluted nitric acid as a pH controller. Five honeycomb structural bodies in each of Run Nos. 1-13 were immersed into 20 of the thus obtained slurry for 2 minutes. After excess slurry was blown off in an air stream, the honeycomb structural bodies were dried at 120° C. Each honeycomb structural body was subjected to a treatment of immersing-drying twice in total, and then fired at 700° C.

After the firing, the honeycomb structural body was weighed, and a loading amount of a coating material in the double dipping was determined. FIG. 1 shows the relation between the average loading amount and the volumetric rate of pores having a diameter of from 0.5 to 5 μm in Run No. 5. FIG. 2 shows the relation between the loading amount and the volumetric rate of pores having a diameter of not less than 10 μm.

In Table 3 are shown coefficients of thermal expansion of each of the cordierite honeycomb structural bodies before and after the coating, and a break temperature of the coated cordierite honeycomb structural body in an electric furnace spalling test.

TABLE 1

|  | Ig. Loss | $SiO_2$ | $Al_2O_3$ | $Fe_2O_3$ | $TiO_2$ | MgO | (wt %) CaO + $K_2O$ + $Na_2O$ |
|---|---|---|---|---|---|---|---|
| Talc | 5.7 | 61.6 | 0.9 | 0.8 | — | 30.5 | 0.3 |
| Kaolin | 13.9 | 45.5 | 38.6 | 0.4 | 1.0 | — | 0.2 |
| Calcined kaolin | 0.1 | 53.1 | 45.0 | 0.4 | 0.9 | — | 0.2 |
| Alumina | 0.3 | — | 99.4 | — | — | — | 0.3 |
| Graphite | 99.8 | 0.1 | 0.1 | — | — | — | — |

TABLE 2

|  | Talc | Kaolin | Calcined kaolin | Alumina | Graphite (External ratio) |
|---|---|---|---|---|---|
| Batch composition | 40.7 | 28.1 | 16.7 | 14.5 | 0~12 |

TABLE 2-continued

| | Talc | Kaolin | Calcined kaolin | Alumina | Graphite (External ratio) |
|---|---|---|---|---|---|
| (wt %) | | | | | |

EXAMPLE 2

Cylindrical cordierite honeycomb structural catalyst carriers (Run Nos. 3, 4, and 14–22) having a wall thickness of 150 μm, a diameter of 101 mm and a length of 152 mm with a pore distribution shown in Table 4 at the number of cells being 62/cm2 were obtained in the same

Table 3

| Run No. | Total pore volume (cc/g) | Porosity (%) | Specific volume of pores of 0.5 to 5 μm in diameter (cc/g) | Percentage of total volume of pores of 0.5 to 5 μm in diameter in total pore volume (%) | Specific volume of pores of 10 μm or more in diameter (cc/g) | Percentage of total volume of pores of 10 μm or more in diameter in total pore volume (%) | Loading amount (%) | Coefficient of thermal expansion before loading (x $10^{-6}$/°C. 40~800° C.) | Coefficient of thermal expansion after loading (x $10^{-6}$/°C. 40~800° C.) | Break temperature in electric furnace spalling test after carriage (°C.) | Remarks |
|---|---|---|---|---|---|---|---|---|---|---|---|
| 1 | 0.212 | 34.8 | 0.091 | 42.9 | 0.107 | 50.5 | 8.7 | 0.60 | 1.12 | 550 | Comparative example |
| 2 | 0.217 | 35.3 | 0.122 | 56.2 | 0.071 | 32.7 | 12.9 | 0.63 | 1.08 | 600 | " |
| 3 | 0.220 | 35.7 | 0.180 | 81.8 | 0.015 | 6.8 | 23.3 | 0.67 | 0.89 | 700 | Present invention |
| 4 | 0.202 | 33.7 | 0.146 | 72.3 | 0.020 | 9.9 | 19.4 | 0.65 | 0.92 | 650 | " |
| 5 | 0.183 | 31.6 | 0.163 | 89.1 | 0.011 | 6.0 | 27.6 | 0.63 | 0.85 | 700 | " |
| 6 | 0.197 | 33.2 | 0.158 | 80.2 | 0.027 | 13.7 | 20.1 | 0.63 | 1.03 | 600 | Comparative example |
| 7 | 0.210 | 34.6 | 0.147 | 70.0 | 0.016 | 7.6 | 18.8 | 0.60 | 0.98 | 650 | Present invention |
| 8 | 0.192 | 32.6 | 0.158 | 82.3 | 0.014 | 7.3 | 22.0 | 0.63 | 0.90 | 650 | " |
| 9 | 0.213 | 34.9 | 0.18 | 85.5 | 0.011 | 5.1 | 24.7 | 0.69 | 0.87 | 700 | Present invention |
| 10 | 0.201 | 35.5 | 0.186 | 92.5 | 0.005 | 2.5 | 28.5 | 0.71 | 0.90 | 700 | " |
| 11 | 0.213 | 34.9 | 0.153 | 71.8 | 0.028 | 13.1 | 18.0 | 0.62 | 1.01 | 600 | Comparative example |
| 12 | 0.225 | 36.2 | 0.180 | 80.0 | 0.022 | 9.9 | 21.9 | 0.66 | 0.93 | 650 | Present invention |
| 13 | 0.194 | 32.8 | 0.126 | 64.9 | 0.044 | 22.6 | 15.0 | 0.61 | 1.07 | 550 | Comparative example |

*Carried amount: weight of carried alumina after firing/ weight of carrier × 100(%)
*Coefficient of thermal expansion: measured in a flow path direction with respect to 50 mmℓ test piece
*Break temperature in electric furnace spalling test: A cylindrical honeycomb structural body of 100 mmφ × 151 mmℓ was held at a certain temperature in an electric furnace for 20 minutes and taken out to room temperature. The temperature was raised stepwise by 50° C. starting from 500° C.

As is clear from the results shown above, Run Nos. 3–5, 7–10 and 12 in which the rates of volumes of pores of 0.5 to 5 μm and pores of not less than 10 μm relative to the total pore volume fallen inside the respective ranges of the present invention were superior to Run Nos. 1, 2, 6, 11 and 13 having the pore volume distribution outside the scope of the present invention with respect to the loading amount, coefficient of thermal expansion, and break temperature in the electric furnace spalling test.

manner as in Example 1. In Table 4, Run Nos. 3 and 4 used the same batches as Run Nos. 3 and 4 in Table 3, respectively. In producing the catalyst carriers in Run Nos. 15–19 and 22, fine graphite was further used as a pore-forming agent. Activated alumina was coated on the thus obtained catalyst carriers by using the same coating slurry as employed in Example 1, and a loading amount was measured in the same experimental manner as in Example 1. Measured loading amounts are shown in Table 4 together with measured compression strength before the coating. FIG. 3 shows the relation among the porosity, loading amount, and compression strength.

Table 4

| Run No. | Total pore volume (cc/g) | Porosity (%) | Specific volume of pores of 0.5 to 5 μm in diameter (cc/g) | Percentage of total volume of pores of 0.5 to 5 μm in diameter in total pore volume (%) | Specific volume of pores of 10 μm or more in diameter (cc/g) | Percentage of total volume of pores of 10 μm or more in diameter in total pore volume (%) | Loading amount (%) | Compression strength before loading (kg/cm²) | Remarks |
|---|---|---|---|---|---|---|---|---|---|
| 3 | 0.220 | 35.7 | 0.180 | 81.8 | 0.015 | 6.8 | 23.3 | 210 | Present invention |
| 4 | 0.202 | 33.7 | 0.146 | 72.3 | 0.020 | 9.9 | 19.4 | 253 | " |
| 14 | 0.171 | 30.1 | 0.138 | 80.7 | 0.015 | 8.8 | 18.0 | 337 | " |
| 15 | 0.231 | 36.7 | 0.169 | 73.2 | 0.020 | 9.1 | 19.6 | 195 | " |
| 16 | 0.264 | 39.6 | 0.185 | 70.3 | 0.026 | 9.8 | 27.0 | 143 | " |
| 17 | 0.278 | 40.5 | 0.216 | 77.7 | 0.026 | 9.3 | 27.1 | 134 | " |

Table 4-continued

| Run No. | Total pore volume (cc/g) | Porosity (%) | Specific volume of pores of 0.5 to 5 μm in diameter (cc/g) | Percentage of total volume of pores of 0.5 to 5 μm in diameter in total pore volume (%) | Specific volume of pores of 10 μm or more in diameter (cc/g) | Percentage of total volume of pores of 10 μm or more in diameter in total pore volume (%) | Loading amount (%) | Compression strength before loading (kg/cm²) | Remarks |
|---|---|---|---|---|---|---|---|---|---|
| 18 | 0.290 | 41.9 | 0.207 | 71.1 | 0.029 | 10.0 | 27.5 | 103 | " |
| 19 | 0.305 | 43.1 | 0.226 | 74.1 | 0.031 | 10.1 | 27.5 | 96 | Comparative example |
| 20 | 0.163 | 29.1 | 0.126 | 77.3 | 0.015 | 9.2 | 12.4 | 351 | " |
| 21 | 0.225 | 36.2 | 0.185 | 82.2 | 0.022 | 9.9 | 24.0 | 207 | Present invention |
| 22 | 0.249 | 38.5 | 0.187 | 75.1 | 0.024 | 9.6 | 23.3 | 146 | " |

*Compression strength: Measured at a cross head speed of 0.5 mm/min with respect to a test piece of 1 inch diameter and 1 inch long cut in a flow path direction.

As is clear from the above results, Run Nos. 3, 4, 14–18, and 21 in which the porosity and the pore volume distribution fall within the respective ranges of the present invention are more excellent than Run Nos. 19 and 20 having the porosity and the pore volume distribution outside the scope of the present invention with respect to the loading amount and compression strength.

With respect to Run No. 3 of the present invention and Run Nos. 1 and 2 as Comparative Examples, the interfaces between the carrier and the coated material of $CeO_2$ and activated alumina were photographed by SEM. FIGS. 4(a), (b) and (c) are photographs showing microstructures of Run No. 3 of the present invention and Run Nos. 2 and 1 as Comparative Examples, respectively. As is seen in FIG. 4(a) showing Example of the present invention, an activated alumina layer was uniformly formed on the surface of the catalyst carrier. To the contrary, as is seen from FIGS. 4(b) and (c) showing Comparative Examples, an activated alumina layer was not uniformly formed. Further, FIG. 4(c) shows that the actuated alumina particles enter the inside of the carrier.

As is clear from the above-detailed explanation, according to the present invention, cordierite honeycomb structural bodies having excellent performance of coatability for a material of high specific surface area and a catalyst thereon and excellent thermal shock resistance after being coated with the high specific surface area-possessing material and the catalyst can be obtained by using cordierite honeycomb structural bodies having specified porosity and pore volume distribution as honeycomb structural catalyst carriers.

What is claimed is:

1. A cordierite honeycomb structural body having a chemical composition consisting of, as main components, 42–56 wt % $SiO_2$, 30–45 wt % $Al_2O_3$, and 12–16 wt % MgO and containing cordierite as a main component of a crystalline phase, wherein said honeycomb structural body has a porosity of greater than 30% and not greater than 42%, and the total volume of all pores in the body consists of not less than 70% pores having a diameter of 0.5–5.0 μm and not greater than 10% pores having a diameter of not less than 10 μm.

2. A cordierite honeycomb structural body according to claim 1, wherein said body has a porosity of greater than 30% and not greater than 36%.

3. A cordierite honeycomb structural body according to claim 1, wherein the total volume of all pores in the body consists of not less than 80% pores having a diameter of 0.5–5.0 μm.

4. A cordierite honeycomb structural body according to claim 1, wherein said body has a coefficient of thermal expansion of not more than $1.0 \times 10^{-6}/°C$. in a temperature range of 40°–800° C.

* * * * *